United States Patent
Rodriguez et al.

(10) Patent No.: US 11,420,471 B2
(45) Date of Patent: *Aug. 23, 2022

(54) DEVICE REMOVABLY MOUNTED TO A SURFACE BY A QUICK DISCONNECT TOOL AND QUICK DISCONNECT MALE CONNECTOR AND METHODS OF USING THE QUICK DISCONNECT AND MALE CONNECTOR TO REMOVABLY MOUNT THE DEVICE TO THE SURFACE

(71) Applicants: Henry Rodriguez, Indian Land, SC (US); Edwin Rodriguez, Elizabeth, NJ (US)

(72) Inventors: Henry Rodriguez, Indian Land, SC (US); Edwin Rodriguez, Elizabeth, NJ (US)

(73) Assignee: Jeffrey S. Melcher, Boca Raton, FL (US)

( * ) Notice: Subject to any disclaimer, the term of this patent is extended or adjusted under 35 U.S.C. 154(b) by 760 days.

This patent is subject to a terminal disclaimer.

(21) Appl. No.: 16/415,112

(22) Filed: May 17, 2019

(65) Prior Publication Data

US 2019/0270340 A1 Sep. 5, 2019

Related U.S. Application Data

(63) Continuation of application No. 15/491,741, filed on Apr. 19, 2017, now Pat. No. 10,343,452.

(60) Provisional application No. 62/333,380, filed on May 9, 2016, provisional application No. 62/324,927, filed on Apr. 20, 2016.

(51) Int. Cl.
*B60B 29/00* (2006.01)
*B25B 13/06* (2006.01)
*B25B 23/10* (2006.01)
*B25B 23/00* (2006.01)

(52) U.S. Cl.
CPC ............ *B60B 29/003* (2013.01); *B25B 13/06* (2013.01); *B25B 23/00* (2013.01); *B25B 23/0071* (2013.01); *B25B 23/101* (2013.01)

(58) Field of Classification Search
CPC ..... B60B 29/00; B60B 29/003; B60B 29/004; B25B 13/00; B25B 13/06; B25B 23/00; B25B 23/0071; B25B 23/10; B25B 23/101
See application file for complete search history.

(56) References Cited

U.S. PATENT DOCUMENTS

| | | | |
|---|---|---|---|
| 4,148,459 A | 4/1979 | Martinez | |
| 5,934,384 A * | 8/1999 | Wang | B25B 23/0035 81/177.85 |
| 6,695,321 B2 * | 2/2004 | Bedi | B25B 15/001 279/22 |

(Continued)

*Primary Examiner* — Robert J Scruggs
(74) *Attorney, Agent, or Firm* — Jeffrey S. Melcher; Melcher Patent Law PLLC (57) ABSTRACT

Provided are a quick disconnect tool and a male connector configured for removably mounting a device on a surface. The tool includes a socket, detents in the socket and a collar to open and close the detents. The male connector fits within the socket and cannot rotate within the socket. The male connector has at a first end a recess into which the detents can lock the male connector inside the socket and threads at a second end opposite the first end. Also provided is a method removably mounting a device to a surface using the quick disconnect too and the male connector.

20 Claims, 8 Drawing Sheets

(56) References Cited

U.S. PATENT DOCUMENTS

| | | | |
|---|---|---|---|
| 7,845,428 B2 | 12/2010 | Sakamaki | |
| 8,893,594 B2* | 11/2014 | Nagel, III | B25B 23/101 |
| | | | 81/451 |
| 10,112,239 B2* | 10/2018 | Hoelz | B23B 31/1071 |
| 10,343,452 B2* | 7/2019 | Rodriguez | B25B 23/00 |
| 2004/0232631 A1* | 11/2004 | Chen | B25B 21/007 |
| | | | 279/75 |
| 2009/0129887 A1* | 5/2009 | Chang | F16B 23/003 |
| | | | 411/402 |
| 2009/0211408 A1* | 8/2009 | Peng | B25B 13/483 |
| | | | 81/125 |
| 2013/0250523 A1* | 9/2013 | Lai | H01L 23/4093 |
| | | | 361/720 |
| 2014/0102745 A1* | 4/2014 | Gomez | F16B 33/002 |
| | | | 411/222 |
| 2015/0247519 A1* | 9/2015 | Call | E04F 13/0832 |
| | | | 411/403 |

* cited by examiner

DEVICE REMOVABLY MOUNTED TO A SURFACE BY A QUICK DISCONNECT TOOL AND QUICK DISCONNECT MALE CONNECTOR AND METHODS OF USING THE QUICK DISCONNECT AND MALE CONNECTOR TO REMOVABLY MOUNT THE DEVICE TO THE SURFACE

FIELD OF THE INVENTION

The invention relates to a quick disconnect tool, a male connector, and a method of using the quick disconnect tool and male connector to removably mount a device to a surface. The tool and male connector are suitable for high strength and high torque applications.

BACKGROUND OF THE INVENTION

The interlocking action in a quick disconnect coupling is commonly provided by a set of balls annularly disposed and received with a suitable clearance into recesses, provided in a cylindrical sleeve of the female portion, the balls cooperating with a groove of the male portion, the side faces of which forming ramps, so that when the male portion is introduced into the female portion, the balls are first moved radially towards the outer by a ramp of the groove of the male portion, and are then resiliently urged into a groove having a suitable contour formed into the peripheral surface of the male portion.

In such a type of quick disconnect coupling, the radial movement of the balls is generally controlled by a surrounding collar slidably received onto the sleeve containing the balls therein, the collar being formed with a ramp which connects two axial bores of different diameters formed into the collar, so that in a first position of the collar, the bore having the smaller diameter surrounds the recesses where the balls are received and prevents the balls to move radially towards the outer, and in a second position of the collar, the bore having the larger diameter surrounds the recesses where the balls are received, thus permitting the balls to move radially towards the outer, the ramp connecting the two bores acting, to move the balls back towards the center of the female portion.

The radial movement of the balls is thus controlled by an axial movement of the locking collar. An example of such a mechanism is described in U.S. Pat. No. 4,148,459 (Martinez), issued on 10 Apr. 1979, the complete disclosure of which is incorporated herein by reference.

This collar is generally biased by a strong compression spring which tends to press the collar against a shoulder counterbored into the cylindrical sleeve. In this first position of the collar, or nonoperative position, the bore having the smaller diameter in the collar surrounds the balls so that they are maintained in their retracted or inner position.

Therefore, a quick disconnect coupling of the above type can operated as follows. The locking collar is slid to its unlocking position and maintained in this position while introducing the male portion into the female portion. When the male portion is fully introduced into the female portion, the locking collar can be released, the return spring moving same back to its first or rest position, thus locking the balls and hence the male portion into the female portion.

Conventional quick disconnects of this type are used on hoses so that the hose is allowed to rotate, i.e. the male portion is allowed to rotate within the female portion. Furthermore, the conventional disconnects are not suitable for high strength applications and/or high torque applications.

SUMMARY OF THE INVENTION

An objective of the invention is to provide a quick-disconnect tool and quick-disconnect male connector that can be quickly connected together for high strength applications in which the male connector and socket are held fast in relation to one another so that the male connector cannot rotate within the socket. The tool and male connector can be used to connect any desired device(s) together.

The objectives of the invention can be obtained by a quick disconnect tool comprising:
a socket defining a hollow socket chamber having a non-circular inner mating surface constructed to mate with a male connector having a non-circular outer mating surface, a socket chamber opening into which the male connector can enter the socket chamber, and at least one detent hole in the socket passing from an outer surface of the socket to the socket chamber;
a detent located in the detent hole; and
a collar having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into the recess of the male connector locking the male connector within the socket chamber.

The objectives and other objectives can also be obtained by a quick disconnect tool and male connector comprising:
the male connector having a non-circular outer mating surface and at least one recess on the outer mating surface; and
the quick disconnect tool comprising:
a socket defining a hollow socket chamber having a non-circular inner surface constructed to mate with the outer mating surface of the male connector, a socket chamber opening into which the male connector can enter the socket chamber, the outer mating surface of the male connector having a shape so that the male connector cannot rotate within the socket chamber, and at least one detent hole in the socket passing from an outer surface of the socket to the socket chamber;
a detent located in the detent hole; and
a collar having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into the recess of the male connector locking the male connector within the socket chamber.

The objectives and other objectives can be obtained by a method of installing a quick disconnect comprising:
  providing a male connector having a non-circular outer mating surface and at least one recess on the outer mating surface;
  providing a quick disconnect tool comprising:
    a socket defining a hollow socket chamber having a non-circular inner surface constructed to mate with the male connector, a socket chamber opening into which the male connector can enter the socket chamber, the outer mating surface of the male connector having a shape so that the male connector cannot rotate within the socket chamber, and at least one detent hole in the socket passing from an outer surface of the socket to the socket chamber;
    a detent located in the detent hole; and
    a collar having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into the recess of the male connector locking the male connector within the socket chamber; and
  inserting the male connector into the chamber of the socket when the collar is in an open position and moving the collar to a closed position when the male connector is inside the chamber to lock the male connector inside the socket chamber.

The objectives can also be obtained by providing a socket defining a hollow socket chamber having a non-circular inner surface constructed to mate a with male connector, a socket chamber opening into which the male connector can enter the socket chamber, the outer mating surface of the male connector having a shape so that the male connector cannot rotate within the socket chamber;
  forming at least one detent hole in the socket passing from an outer surface of the socket to the socket chamber;
  inserting a detent located into the at least one detent hole; and
  sliding a collar over the socket, the socket having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into a recess of the male connector locking the male connector within the socket chamber.

The present invention provides numerous advantages over conventional quick disconnects. Conventional quick disconnects provide a fluid secure connection and the male and female connections can rotate in relation to each other. In contrast, in the present invention, the female tool can be used to drive the male connector, i.e. thread the male connector onto a rod or into a surface. Conventional male connectors cannot be driven onto a bolt or into a surface since there can be no torque transfer between the female connector and the male connector. The present invention provides a high strength and high torque connection in which the female tool and male connector cannot rotate in relation to each other. In the present invention, a mounted male connector can be used to connect any desired device in which a high strength and high torque connection is desirable.

DETAILED DESCRIPTION OF THE INVENTION

The invention will now be explained with reference to the attached non-limiting drawings. The quick disconnect tool 2 and male connector 40, 41 can be formed of any suitable material, including, but not limited to, metals, ceramics, plastics, composites, and alloys. A preferred material is steel.

Figure 1A:
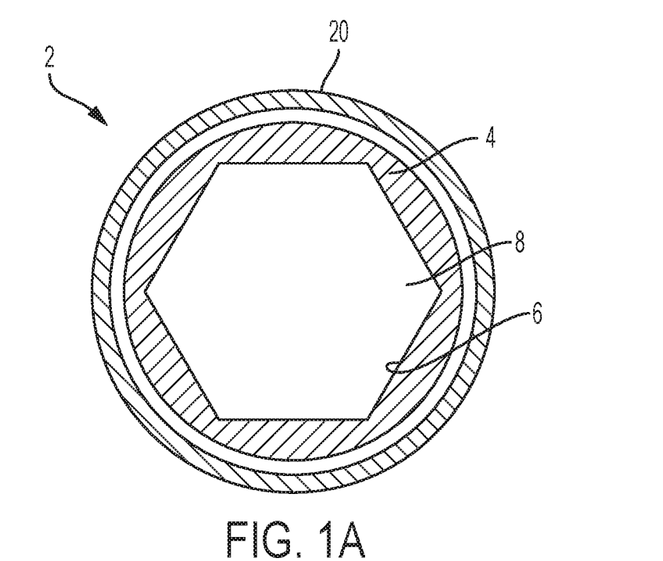
FIG. 1A illustrates a bottom view of the tool.
Figure 1B:
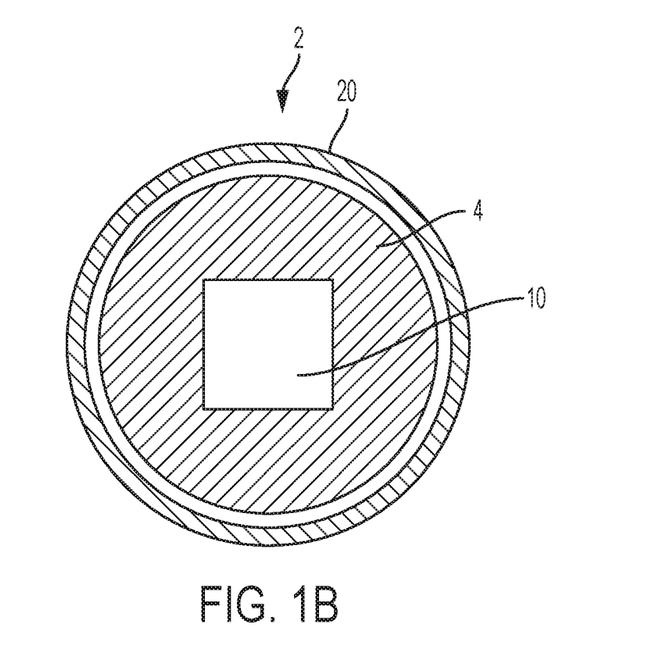
FIG. 1B illustrates a top view of the tool.
Figure 1C:
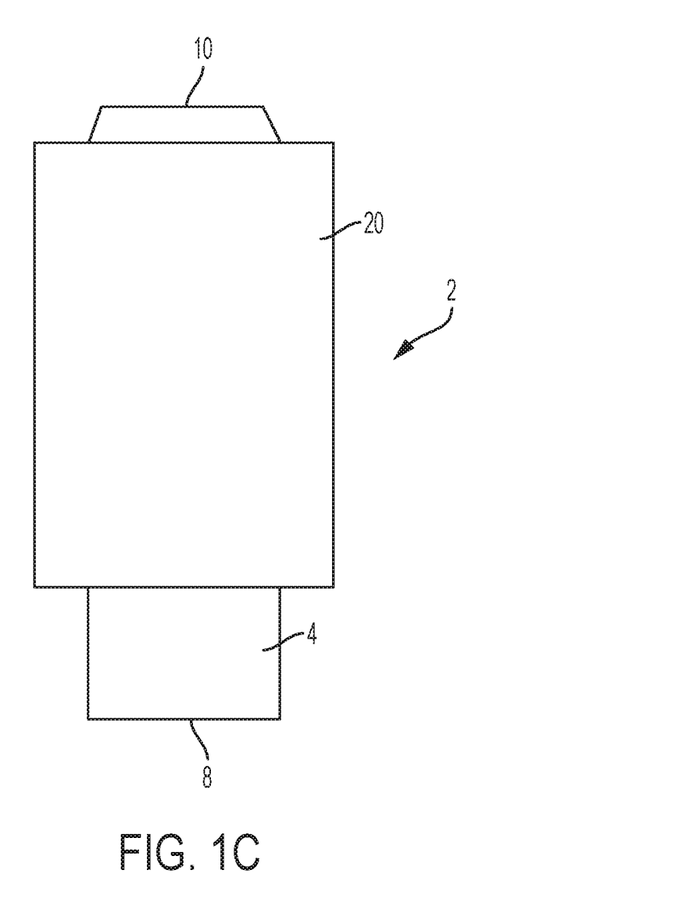
FIG. 1C illustrates a side view of the tool.

As shown in FIGS. 1A-1C, the tool 2 comprises a socket 4. The socket 4 has a socket body defining a hollow socket chamber 6 having a non-circular inner surface constructed to mate with the non-circular mating surface 44 of the quick disconnect male connector 40, 41. The socket 4 includes a socket opening 8 into which the male connector 40, 41 can enter the socket chamber 6. The tool 2 also includes a collar 20 and optionally a socket connector 10.

Figure 2A:
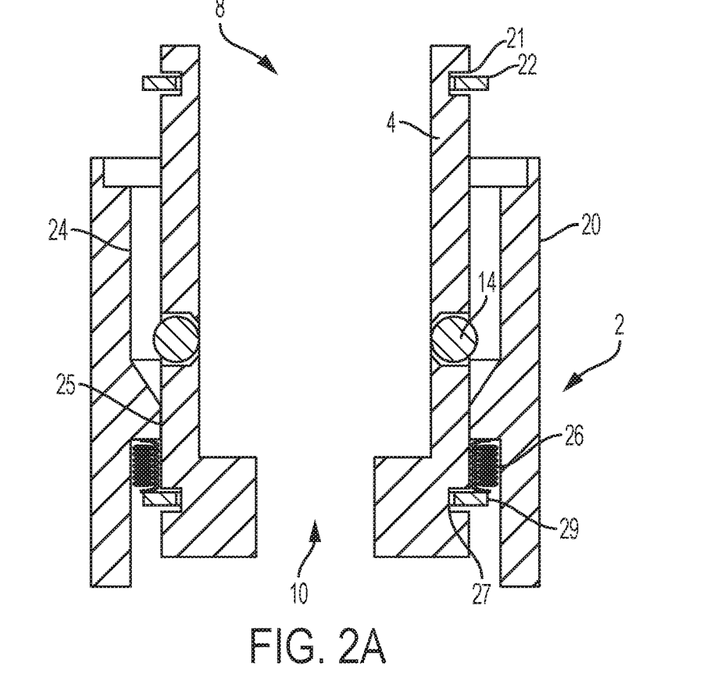
FIG. 2A illustrates a cut-away view of the tool in an open position where the detent does not protrude into the socket cavity.
Figure 2B:
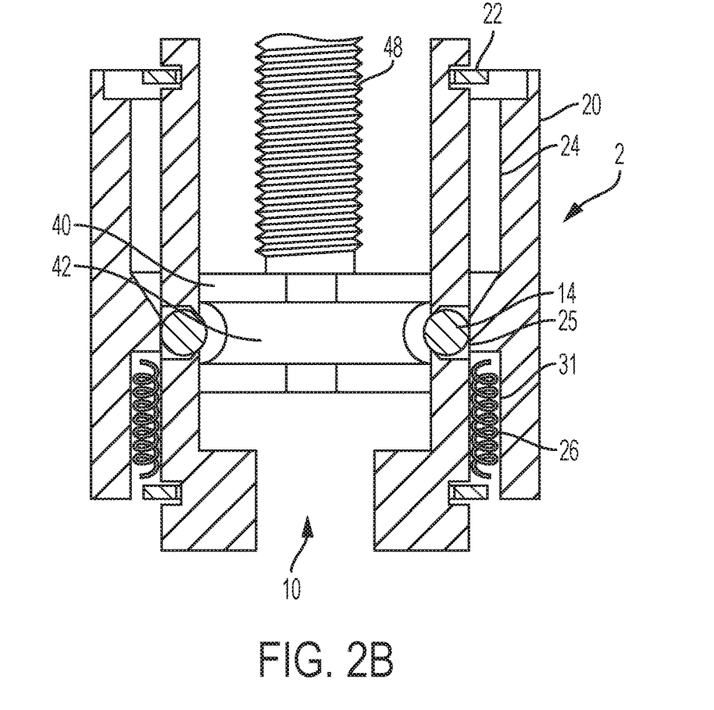
FIG. 2B illustrates a cut-away view of the tool in a closed position where the detent protrudes into the socket cavity.
Figure 3A:
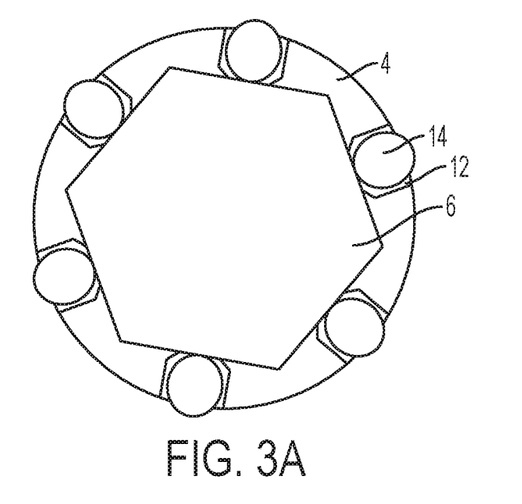
FIG. 3A illustrates a cut-away view of the tool having the detents in a closed position protruding into the socket cavity.
Figure 3B:
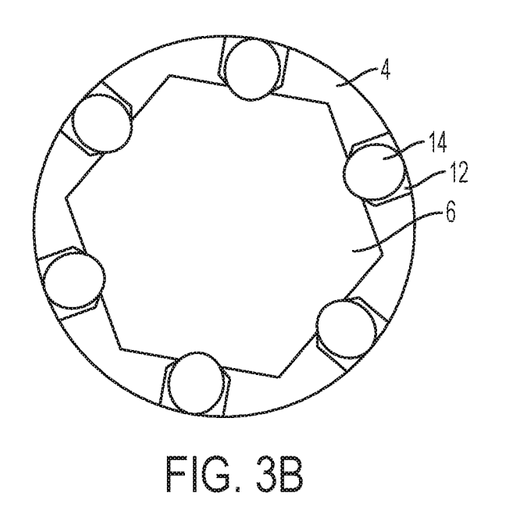
FIG. 3B illustrates a cut-away view of the tool having the detents in an open position not protruding into the socket cavity.

FIGS. 2A and 2B illustrate an internal view of the tool 2. The socket 4 contains at least one detent hole 12 in the socket 4 passing from an outer surface of the socket 4 to the socket chamber 6. FIGS. 3A and 3B show a preferred hexagon form with six detent holes 12. A detent 14 is present in the detent hole 12. The collar 20 is constructed sized to slide over the socket 4. The collar 20 has an inside surface that slides over the outer surface of the socket 4. The inside surface of the collar 20 has a locking surface 25 and an unlocking surface 24, when the collar 20 is in a closed position on the socket 4, as shown in FIG. 2B, the locking surface 25 pushes the detent 14 into a closed position where the detent 14 protrudes into the socket chamber 6. When the collar 20 is slid into an open position, as shown in FIG. 2A, the unlocking surface 24 allows the detent 14 to not protrude into the socket chamber 6. When the male connector 40 is within the socket chamber 6 and the detent 14 is in a closed position as shown in FIG. 2B the detent 14 protrudes into the recess 42 of the male connector 40 locking the male connector 40 at an insertion position within the socket chamber 6 so that the male connector 40 cannot move further in or out of the chamber 6. The non-circular mating surface 44 of the male connector 40 and the non-circular inner mating surface of chamber 6 prevent the male connector 40 from rotating within the chamber 6 and the detent 14 locks the male connector 40 within the chamber 6. FIG. 3A is another view of the detents 14 in a locked position protruding within the chamber 6. 3B is another view of the detents 14 in an unlocked position not protruding within the chamber 6. The socket 4 has channels 21 and 27, and each channel 21, 27 having an associated removable retaining ring 22 and 29 present for retaining the collar 20 on the socket 4. The collar can cover both of the retaining rings 22 and 29 when the collar 20 is in a closed position, shown in FIG. 2B, and the retaining ring 22 can be exposed when the collar 20 is in an open position, shown in FIG. 2A. The tool 2 can include a spring 26 for biasing the collar 20 into a closed position. The spring 26 can be between the retaining ring 29 and a ridge 31 on the inside of the collar 20. When the collar 20 is slid into the open position, the first retaining ring 22 can be exposed and removed. With the first retaining ring 22 removed, the collar 20 can be slid off of the socket 4. Then the second retaining ring 27 can then be removed. Other retaining devices can be used in place of the retaining rings 22 and 27 to retain the collar 20 on the socket 4. The preferred form of the collar 20 is shown in the Figs in which the collar 20 slides along the outside surface of the socket 4 in a lengthwise direction. However, other collar designs can be utilized, such as collars that slide along the outside surface of the socket 4 in a widthwise direction, i.e. rotate about socket, or that slide in any direction along the outside surface of the socket 4 as desired. The main function of the collar is to lock and unlock the detent(s) 14.

Figure 4A:
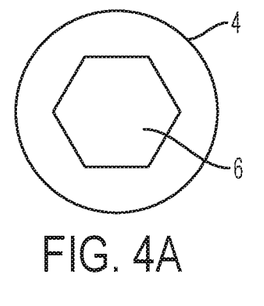
FIGS. 4A-4C illustrate exemplary non-circular shapes for the inside surface of the socket chamber.
Figure 4B:
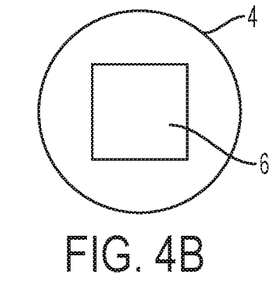
Figure 4C:
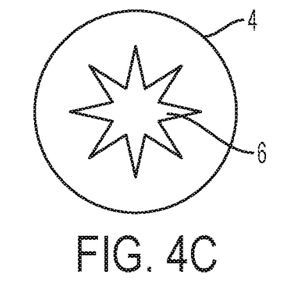
Figure 5A:
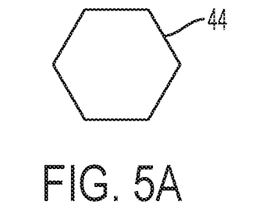
FIGS. 5A-5C illustrate top views of exemplary non-circular shapes for the male connector mating surface.
Figure 5B:
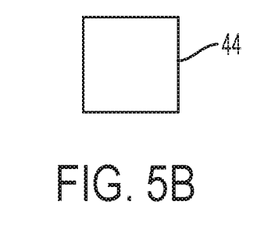
Figure 5C:
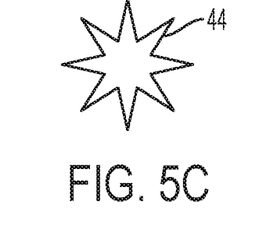

The non-circular mating surface 44 and the non-circular shape of the chamber 6 can be any desired non-circular shape. Preferred non-circular shapes are hexagonal, square, and star shapes. Examples of preferred non-circular shapes for the chamber 6 include square, hexagon and star as shown in FIGS. 4A-4C. Examples of preferred non-circular shapes for the mating surface 44 include square, hexagon and star as shown in FIGS. 5A-5C. The shape of the mating surface 44 does not have to be the same as the shape of the chamber 6. The only requirements are that the male connector 40 is capable of being inserted into the chamber 6 and that the male connector 40 cannot rotate within the chamber 6. Preferably, the mating surface 44 and chamber 6 have the same shape.

Sockets for installing or removing bolts and nuts are now well known. Conventional sockets can be modified for use in the present invention by adding the detent hole(s) 12, channel 21 and channel 27, and then installing the detent(s) 14, spring 26, retaining rings 22 and 29, and collar 20. Conventional sockets are most commonly hexagonal, or more commonly referred to as "6-point" in lay terms. Conventional sockets are driven by being attached to the driving tool via a male/female square connection fitting called the square drive, which is an example of suitable socket connector 10. Standard sizes of square drives around the world include ¼", ⅜", ½", ¾", 1", 1½", 2½" and 3½" square drive sizes (a de facto international standard with no metric equivalents) along with some lesser used drivers such as ⅝" square drive, and both #4 and #5 spline drives specified in ANSI B107 specifications. This wide range of square drive sizes provides for a wide variety of socket types and sizes to suit small to very large nuts and bolts. Some square drivers have a through hole to attach the socket to the driver (using a retaining ring with o-ring and pin type, or single piece molded retaining rings), a locking pin, or friction ball. Some common hand ratchets employ a quick release button on their top for quick socket release of smaller sockets. The tool chosen to drive the socket wrench ultimately supplies the mechanical advantage needed by the user to provide the torque needed to loosen or tighten the fastener as may be required. Larger drivers are typically used with higher torque, while smaller drivers are used for convenience in smaller low torque applications. Given the limits of human strength and fatigue, torque above 600 ft-lbs of torque will generally involve some kind of power assist, instead of the user simply pushing on the handle of a wrench. Very large sockets and drivers are typically powered by hydraulics to achieve torque. The present invention is suitable for any size socket and torque.

Figure 6A:
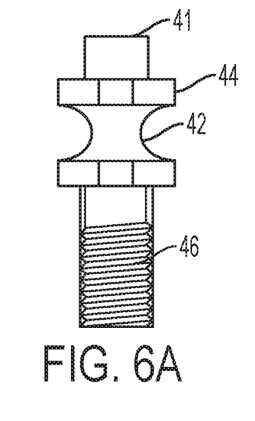
FIGS. 6A-6C illustrate side views of exemplary types of quick disconnect male connectors.
Figure 6B:
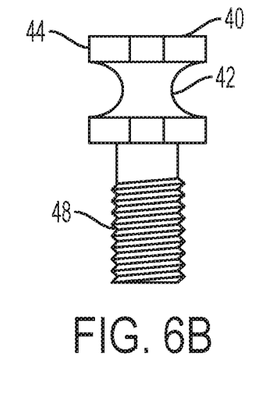
Figure 6C:
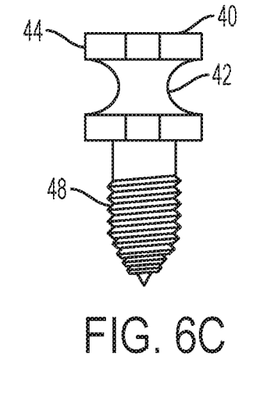

Bolts having external threads and nuts having internal threads, both of which have a non-circular mating surface that mates with a socket to rotate the bolts and nuts are now well known. The male connector 40 can be a formed from conventional bolts or nuts by forming a recess 42 in the non-circular mating surface 44 of the bolt or nut that is constructed to mate with the socket chamber 6. Examples of such modified bolts, male connector 40, are shown in FIGS. 6A-6C. The external threads 48 of the male connector 40 can be of any desired type, such as threads that screw into a threaded hole or into a surface, and into any desired material such as wood, metal, composites, ground, rock, plastic or any other surface. The threads can be performed in the material or formed by the threads on the bolt as the bolt is threaded into the surface. The internal threads 46 of the male connector 40 can be threaded onto any rod having mating threads or the threads on the rod can be formed as the male connector 40 is threaded onto the rod. The recess 42 is preferably formed in the non-circular mating surface 44 so that the mating surface 44 is both sides of the recess as shown in the FIG. 6.

Figure 7:
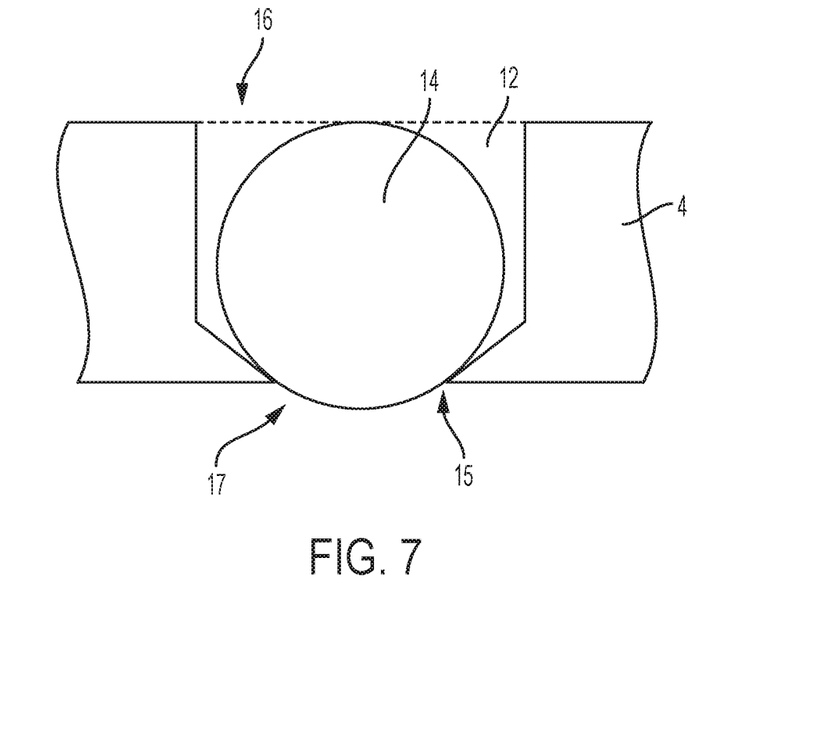
FIG. 7 illustrates and exemplary detent hole and detent.

As shown in FIG. 7, the detent hole 12 can have a smaller diameter at the opening 15 to the socket chamber 6 than the opening 16 to the outer surface of the socket 4 so that only a portion of the detent 14 can pass into socket chamber 6. If the detent 14 is in a preferred ball shape, the opening 16 can be larger than the diameter of the ball detent 14 so the detent can be inserted into the detent hole 12 and the opening 15 can be smaller than ball detent 14 diameter so that the ball detent 14 cannot fall or move entirely into the chamber 6 and only a portion 17 of the detent 14 can protrude into the chamber 6. While a ball shape is shown in the drawings, the detent 14 can have any desired shape.

Figure 8:
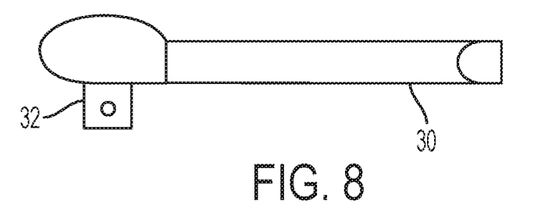
FIG. 8 illustrates an exemplary handle.
Figure 9:
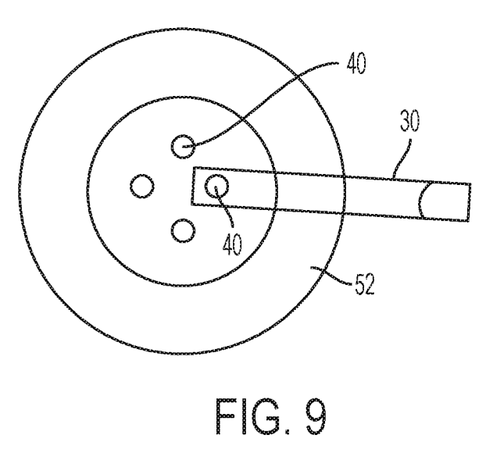
FIG. 9 illustrates use of a handle mounted to modified lug nut of a vehicle tire.

The socket 4 can include a socket connector 10 for connecting devices to the socket 4. The socket connector 10 can be any desired shape and function. A preferred example of socket connector 10 is a conventional socket connector in the shape of a square so that any device have a square socket connector can be connected to the socket 4. An example of a devise is a socket handle 30 (FIG. 8) having a male socket connector 32 that can be inserted into the socket connector 10. The tool 2 can provides high strength and can be used under high loads. As shown in FIG. 9, the male connector 40 can be a lug nut on a vehicle wheel 52. The tool 2 can be used to attach a handle 30 that extends beyond the wheel to the male connector 40 (lug nut). When the wheel 52 is powered by the vehicle, the wheel 52 and vehicle can be lifted by the handle 30 contacting the ground as the wheel 52 is turned to thereby move the vehicle out of a hole, sand, mud, snow, or other situation. Since the socket 4 and male connector 40 do not rotate in relation to each other, there is very little or no friction or wear occurring during use. Another example of a device is chains that can be easily and quickly attached to the lug nut male connector 40 using the tool 2. The tool 2 is capable of releasably and quickly connecting one or more devices together in to provide a high torque and high strength connection.

Figure 10:
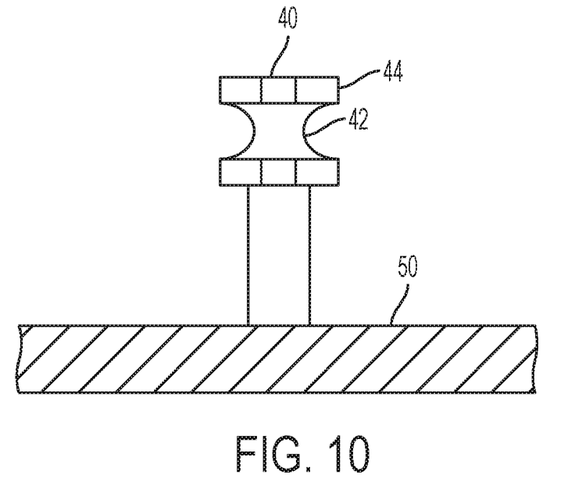
FIG. 10 illustrates a male connector mounted to a device.
Figure 11:
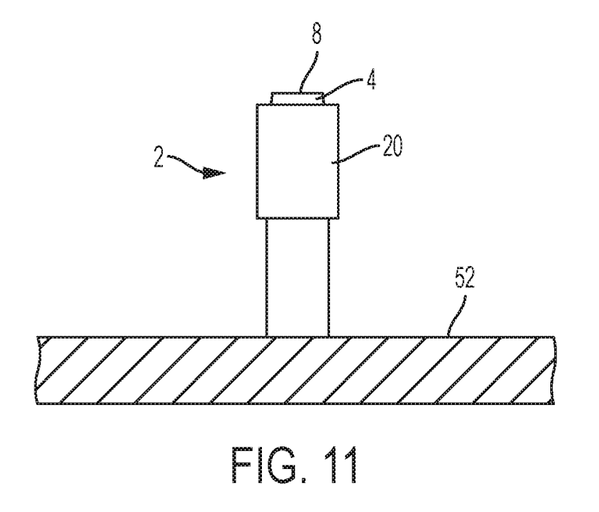
FIG. 11 illustrates a tool mounted to a device.

In another embodiment, as shown in the FIG. 10, the male connector can be fastened to or integrally formed with a first device 50 in any desired matter, such as welding, gluing, mechanical fastening, being integrally formed, etc. As shown in FIG. 11, the socket 4 can be can be fastened to or integrally formed with a second device 51 in any desired matter, such as welding, gluing, mechanical fastening, being integrally formed, etc. Thus, any combination of devices can fastened to each other so that the devices cannot move or rotate with regard to each other under high loads. For example, an entire multi-ton vehicle can be lifted with one tool and male connector.

The male connector 40, 41 can be driven into a surface using the tool 2, such as a wall, floor, ground, or any other surface to provide a quick disconnect capability. Devices having a tool 2 mounted thereon can easily be connected to the male connector 40, 41 to provide a high strength and high torque connection between the device and the surface. Examples of devices include shelves, pictures, cabinets, hangers, televisions, and cables. The tool 2 and male connector 40, 41 can be suitable for climbing applications, where the connector 40, 41 is driven into a rock face. The tool 2 and male connector 40, 41 preferably do not provide a fluid transfer, as shown in the Figs.

While the claimed invention has been described in detail and with reference to specific embodiments thereof, it will be apparent to one of ordinary skill in the art that various changes and modifications can be made to the claimed invention without departing from the spirit and scope thereof. For example, while a collar 20 is shown in the drawings, other structures to close and open the detents 14 can be used.

The invention claimed is:

1. A method of removably mounting a device on a surface comprising:
   providing a male connector having on a first end a non-circular outer mating surface and at least one recess on the outer mating surface, and the male connector having threads on a second end opposite the first end;
   rotating the male connector to fasten the second end of the male connector to the surface by the threads to provide a mounted male connector that is mounted on the surface so that the first end of the male connector is exposed;
   providing a quick disconnect tool comprising:
      a socket defining a hollow socket chamber having a non-circular inner surface constructed to mate with the male connector, a socket chamber opening into which the male connector can enter the socket chamber, the outer mating surface of the male connector having a shape so that the male connector cannot rotate within the socket chamber, and at least one detent hole in the socket passing from an outer surface of the socket to the socket chamber;
      a detent located in the detent hole; and
      a collar having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into the recess of the male connector locking the male connector within the socket chamber;
   connecting the quick disconnect tool to the device; and
   inserting the mounted male connector into the chamber of the socket when the collar is in an open position and moving the collar to a closed position when the male connector is inside the chamber to lock the male connector inside the socket chamber and removably mount the device to the surface so that the removably mounted device cannot rotate in relation to the mounted male connector.

2. The method according to claim 1, further comprising using a second quick disconnect tool to rotate the male connector and when the male connector is mounted on the surface moving the collar into an open position and removing the second quick disconnect tool from the male connector.

3. The method according to claim 1, wherein the threads are external, and the method comprises rotating the male connector to screw the threads into the surface.

4. The method according to claim 1, wherein the threads are internal, and the method comprises rotating the male connector to screw the threads onto threaded shaft.

5. The method according to claim 1, wherein the surface comprises a wall, and the method comprises rotating the male connector to mount the male connector on the wall.

6. The method according to claim 1, wherein the socket chamber is the shape of a hexagon, a square, or a star.

7. The method according to claim 1, wherein the surface comprises a wall, a floor, ground or a rock face, and the method further comprising rotating the male connector to mount the male connector to the wall, the floor, the ground or the rock face.

8. The method according to claim 7, wherein the device comprises a shelf, a picture, a cabinet, a hanger, a television, or a cable.

9. The method according to claim 1, wherein the outer mating surface of the male connector and the inner surface of the socket chamber are substantially the same shape.

10. The method according to claim 1, further comprising mounting a plurality of the male connectors on the surface and connecting a plurality of the quick disconnect tools to the device, and inserting the plurality of mounted male connectors into an associated quick disconnect tool to removably mount the device to the surface so that the removably mounted device cannot rotate in relation to the mounted male connector.

11. A quick disconnect tool and male connector configured to mount a device to a surface comprising:
   the male connector having on a first end a non-circular outer mating surface and at least one recess on the outer mating surface, and the male connector having threads on a second end opposite the first end configured for mounting the male connector to a surface;

the quick disconnect tool comprising:

a socket defining a hollow socket chamber having a non-circular inner surface constructed to mate with the outer mating surface of the male connector, a socket chamber opening into which the male connector can enter the socket chamber, the outer mating surface of the male connector having a shape so that the male connector cannot rotate within the socket chamber, and at least one detent hole in the socket passing from an outer surface of the socket to the socket chamber; and a detent located in the detent hole; and a collar having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into the recess of the male connector locking the male connector within the socket chamber, and a socket connector configured for connecting the device to the quick disconnect tool.

12. The quick disconnect tool and male connector according to claim 11, wherein the outer mating surface of the male connector and the inner surface of the socket chamber are substantially the same shape.

13. The quick disconnect tool and male connector according to claim 11, wherein the socket chamber is the shape of a hexagon, a square, or a star.

14. The quick disconnect tool and male connector according to claim 11, wherein the threads are external.

15. The quick disconnect tool and male connector according to claim 11, wherein the device comprises a shelf, a picture, a cabinet, a hanger, a television, or a cable.

16. The quick disconnect tool and male connector according to claim 11, wherein the surface comprises a wall, a floor, ground or a rock face.

17. The quick disconnect tool and male connector according to claim 11, wherein the outer mating surface of the male connector and the inner surface of the socket chamber are substantially the same shape.

18. A device removably mounted on a surface comprising:

at least one male connector mounted on the surface by threads; and at least one quick disconnect tool according connected to the device and removably connected to the at least one male connector so that the device is removably connected to the surface and the device cannot rotate in relation to the male connector, wherein the male connector having on a first end a non-circular outer mating surface and at least one recess on the outer mating surface, and the male connector having the threads on a second end opposite the first end configured for mounting the male connector to a surface;

the quick disconnect tool comprising:

a socket defining a hollow socket chamber having a non-circular inner surface constructed to mate with the outer mating surface of the male connector, a socket chamber opening into which the male connector can enter the socket chamber, the outer mating surface of the male connector having a shape so that the male connector cannot rotate within the socket chamber, and at least one detent hole in the socket passing from an outer surface of the socket to the socket chamber; and a detent located in the detent hole; and a collar having an inside surface that slides over the outer surface of the socket, the inside surface of the collar having a locking surface and an unlocking surface, when the collar is in a closed position on the socket the locking surface pushes the detent into a closed position where the detent protrudes into the socket chamber and when the collar is in an open position the unlocking surface allows the detent to not protrude into the socket chamber, wherein when the male connector is within the socket chamber and the detent is in a closed position the detent protrudes into the recess of the male connector locking the male connector within the socket chamber, and a socket connector configured for connecting the device to the quick disconnect tool.

19. The device according to claim 18, wherein the device comprises a shelf, a picture, a cabinet, a hanger, a television, or a cable.

20. The device according to claim 18, wherein the surface comprises a wall, a floor, ground or a rock face.

* * * * *